US012159612B2

(12) United States Patent
Shiao

(10) Patent No.: US 12,159,612 B2
(45) Date of Patent: Dec. 3, 2024

(54) METHOD FOR ADJUSTING NOISE CANCELLATION MODE, ELECTRONIC DEVICE, AND COMPUTER READABLE STORAGE MEDIUM

(71) Applicant: BOMDIC INC., New Taipei (TW)

(72) Inventor: Yao Shiao, New Taipei (TW)

(73) Assignee: BOMDIC INC., New Taipei (TW)

( * ) Notice: Subject to any disclaimer, the term of this patent is extended or adjusted under 35 U.S.C. 154(b) by 283 days.

(21) Appl. No.: 17/709,376

(22) Filed: Mar. 30, 2022

(65) Prior Publication Data

US 2023/0317046 A1 Oct. 5, 2023

(51) Int. Cl.
*G10K 11/178* (2006.01)

(52) U.S. Cl.
CPC .. *G10K 11/17823* (2018.01); *G10K 11/17827* (2018.01); *G10K 2210/504* (2013.01)

(58) Field of Classification Search
CPC ........ G06F 16/683; G06F 3/162; G06F 16/68; G06F 3/165; G06F 16/635
USPC .......................................................... 700/94
See application file for complete search history.

(56) References Cited

U.S. PATENT DOCUMENTS

| | | | | |
|---|---|---|---|---|
| 2021/0160605 | A1* | 5/2021 | Igarashi | G01S 15/06 |
| 2022/0189451 | A1* | 6/2022 | Rui | G10K 11/1783 |
| 2022/0293082 | A1* | 9/2022 | Yamabe | G10K 11/17833 |
| 2023/0317046 | A1* | 10/2023 | Shiao | G10K 11/17823 700/94 |

* cited by examiner

*Primary Examiner* — Alexander Krzystan
(74) *Attorney, Agent, or Firm* — JCIPRNET

(57) ABSTRACT

The embodiments of the disclosure provide a method for adjusting a noise cancellation mode, an electronic device, and a computer readable storage medium. The method includes: estimating a noise perception indicator corresponding to an environmental noise; and adjusting a noise cancellation mode of an wearable audio device according to the noise perception indicator.

13 Claims, 5 Drawing Sheets

METHOD FOR ADJUSTING NOISE CANCELLATION MODE, ELECTRONIC DEVICE, AND COMPUTER READABLE STORAGE MEDIUM

BACKGROUND

1. Field of the Invention

The present disclosure generally relates to an audio management mechanism, in particular, to a method for adjusting a noise cancellation mode, an electronic device, and a computer readable storage medium.

2. Description of Related Art

According to some research, being in a noisy environment for a long time is highly possible to cause mental and/or physical health problems in people. For example, the higher the noise decibel, the easier it is to affect the mood and sleep quality of people. The high noise decibel also makes the blood vessels more easily contracted and the protruding plaques in the blood vessels rupture, which causes blood clots, thereby increasing the risk of stroke, myocardial infarction, etc.

In addition, noises would also negatively affect other physiological features of people, such as blood pressure levels, blood sugar levels, stress hormones, heart rate, and cholesterol. Therefore, it is crucial to design a mechanism for preventing noise from affecting people's mental and physical health.

However, since different people have different perceptions of sounds, it is difficult to establish an objective standard for noises. For example, an 80 dB sound may be an intolerant noise to some people, but for other people (e.g., vendors selling stuff by roadsides), this sound maybe just a sound with regular decibels.

Nowadays, some products (e.g., earphones, headphones, headsets, earpieces, etc.) are capable of providing noise cancellation functions such as active noise cancellation (ANC). For example, an earphone (e.g., a wireless earphone) with ANC function can detect the environmental noise and accordingly prevent the user from hearing the environmental noise by combining the environmental noise with a particular signal, such that the user would not completely perceive the environmental noise.

However, due to a human being usually living in a noisy environment, people will usually feel odd in a truly quiet environment, for example, some people will feel dizziness when staying in an anechoic chamber. Therefore, generally the user has to manually choose the required noise cancellation mode from, for example, strong noise cancellation mode, medium noise cancellation mode, weak noise cancellation mode, etc. That is, no technical solution has been proposed for automatically determining the noise cancellation mode.

SUMMARY OF THE INVENTION

Accordingly, the disclosure is directed to a method for adjusting a noise cancellation mode, an electronic device, and a computer readable storage medium, which may be used to solve the above technical problems.

The embodiments of the disclosure provide a method for adjusting a noise cancellation mode, adapted to an electronic device, including: estimating a noise perception indicator corresponding to an environmental noise; and adjusting a noise cancellation mode of an wearable audio device according to the noise perception indicator.

The embodiments of the disclosure provide an electronic device including a storage circuit and a processor. The storage circuit stores a program code. The processor is coupled to the storage circuit and accessing the program code to perform: estimating a noise perception indicator corresponding to an environmental noise; and adjusting a noise cancellation mode of an wearable audio device according to the noise perception indicator.

The embodiments of the disclosure provide a computer readable storage medium, the computer readable storage medium recording an executable computer program, the executable computer program being loaded by an electronic device to perform steps of: estimating a noise perception indicator corresponding to an environmental noise; and adjusting a noise cancellation mode of an wearable audio device according to the noise perception indicator.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
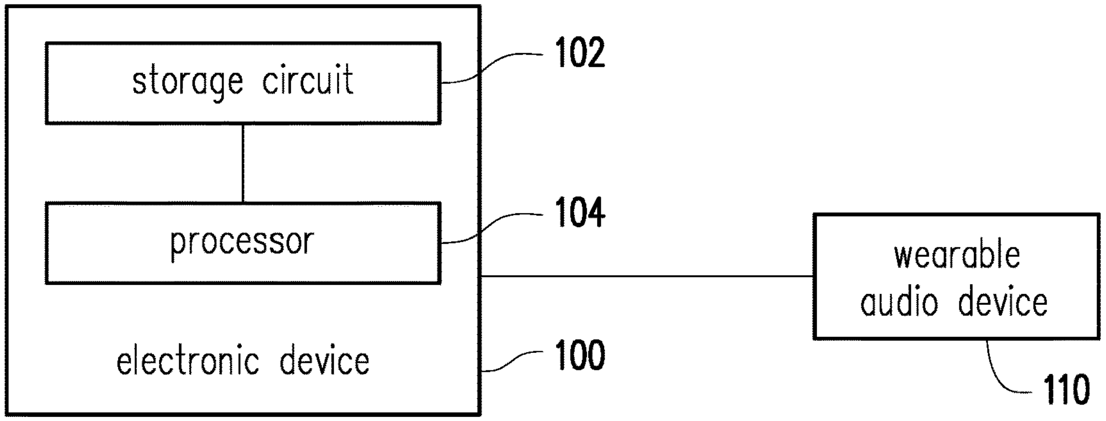
FIG. 1A shows a schematic diagram of an electronic device and an wearable audio device according to an embodiment of the disclosure.

Reference will now be made in detail to the presently preferred embodiments of the disclosure, examples of which are illustrated in the accompanying drawings. Wherever possible, the same reference numbers are used in the drawings and the description to refer to the same or like parts.

See FIG. 1A, which shows a schematic diagram of an electronic device and an wearable audio device according to an embodiment of the disclosure. In various embodiments, the electronic device 100 can be one or a combination of a smart device, a computer device, and a wearable device (e.g., a smartwatch, a smart bracelet, a smart band, a smart ring, and/or a smart necklace, etc.), but the disclosure is not limited thereto.

In one embodiment, the electronic device 100 can be coupled to an wearable audio device 110, including wired wearable audio device and wireless wearable audio device.

In one embodiment, the wearable audio device 110 can be any device capable of providing audio processing/output functions. In one embodiment, the wearable audio device 110 can be one device or a pair of devices coupled to the electronic device 100.

In one embodiment, the electronic device 100 can be directly coupled to the wearable audio device 110. For example, the electronic device 100 can be a smartwatch directly coupled to the wearable audio device 110.

In another embodiment, the electronic device 100 can be indirectly coupled to the wearable audio device 110. For example, the electronic device 100 and the wearable audio device 110 can be some peripheral devices connected to the same control device, such as the smartwatch and the wireless earphone connected to a smartphone.

In FIG. 1A, the electronic device 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules stored in the storage circuit 102 to implement the method for adjusting a noise cancellation mode provided in the disclosure for controlling the noise cancellation mode of the wearable audio device 110.

In one embodiment, the electronic device 100 can directly control the noise cancellation mode of the wearable audio device 110. In another embodiment, the electronic device 100 can indirectly control the noise cancellation mode of the wearable audio device 110 via, for example, the smart device connected to both of the electronic device 100 and the wearable audio device 110.

Figure 1B:
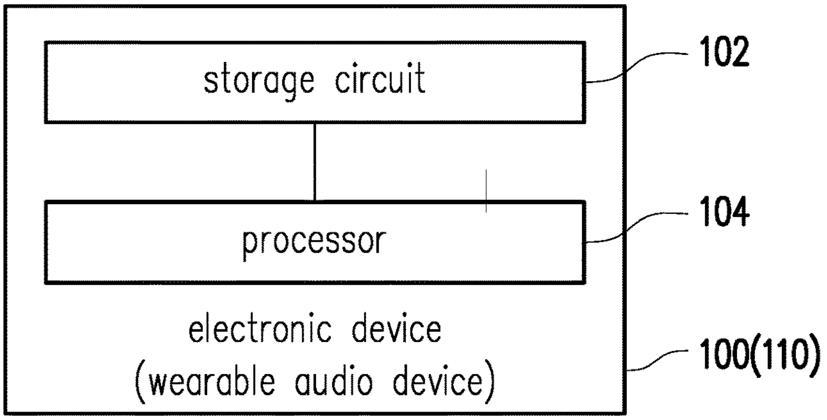
FIG. 1B shows another schematic diagram of the electronic device and the wearable audio device according to FIG. 1A.

See FIG. 1B, which shows another schematic diagram of the electronic device and the wearable audio device according to FIG. 1A. In FIG. 1B, the electronic device 100 and the wearable audio device 110 can be integrated into one device. In this case, the electronic device 100 (i.e., the wearable audio device 110) can autonomously determine the noise cancellation mode of itself. For example, in the embodiment where the electronic device 100 (i.e., the wearable audio device 110) is implemented as a wireless earphone(s), the electronic device 100 can autonomously determine and adjust the noise cancellation mode of itself. In one embodiment, the electronic device 100 can further include audio receiving elements (such as a microphone or a microphone array) for receiving sounds such as environmental noise.

In the embodiments of the disclosure, the processor 104 may access the modules stored in the storage circuit 102 to implement the method for adjusting a noise cancellation mode provided in the disclosure, which would be further discussed in the following.

Figure 2:
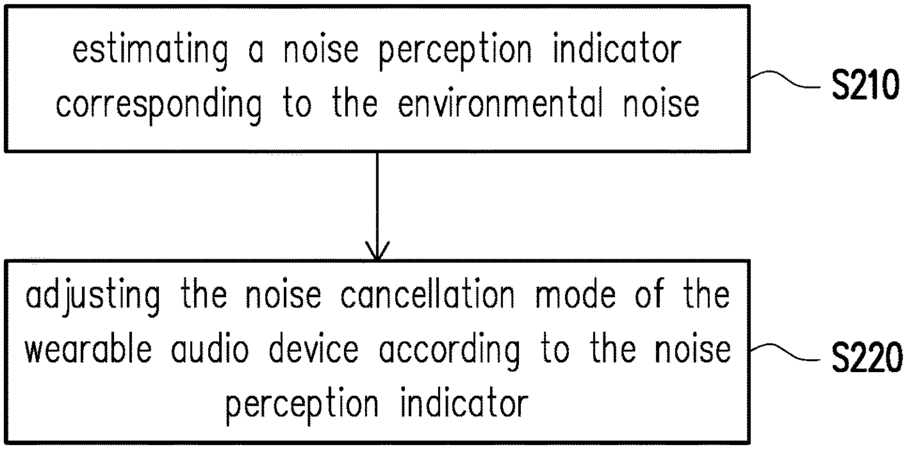
FIG. 2 shows a flow chart of the method for d adjusting a noise cancellation mode according to an embodiment of the disclosure.

See FIG. 2, which shows a flow chart of the method for adjusting a noise cancellation mode according to an embodiment of the disclosure. The method of this embodiment may be executed by the electronic device 100 in FIG. 1A and FIG. 1B, and the details of each step in FIG. 2 will be described below with the components shown in FIG. 1A and FIG. 1B.

In step S210, the processor 104 estimates a noise perception indicator corresponding to the environmental noise. In one embodiment, after the environmental noise is detected by the electronic device 100 and/or the wearable audio device 110, the processor 104 can estimate the noise perception indicator. In one embodiment, the noise perception indicator can be understood as an indicator for representing the mental/physical feeling of the user about the environmental noise.

In one embodiment, since the environmental noise may affect the physiological features of the user, the processor 104 can estimate the noise perception indicator based on the physiological feature(s) of the user of the electronic device 100. In the embodiments where the electronic device 100 and/or the wearable audio device 110 are implemented as wearable devices, the electronic device 100 and/or the wearable audio device 110 can obtain the physiological feature(s) (such as the heart rate (HR), the heart rate variation (HRV), etc.) of the user by emitting and measuring Photoplethysmography (PPG) or Electrocardiography (ECG) signals, but the disclosure is not limited thereto.

In one embodiment, the processor 104 can further obtain a stress indicator of the user based on the measured physiological features. For example, the processor 104 can derive the stress indicator based on, for example, the HR and/or the HRV, but the disclosure is not limited thereto. Details of deriving the stress indicator based on the measured physiological features can be referred to the related prior art (e.g., "Chalmers, T.; Hickey, B. A.; Newton, P.; Lin, C.-T.; Sibbritt, D.; McLachlan, C. S.; Clifton-Bligh, R.; Morley, J.; Lal, S. *Stress Watch: The Use of Heart Rate and Heart Rate Variability to Detect Stress: A Pilot Study Using Smart Watch Wearables. Sensors* 2022, 22, 151."), which would not be further discussed herein.

In one embodiment, since the higher the dB of the environmental noise, the more possible the user feels disturbed, the processor 104 can estimate the noise perception indicator based on the noise power of the environmental noise. In addition, since some sounds with particular frequency components (e.g., the squeaky sounds generated when a blackboard is scratched) may also make the user feel disturbed, the processor 104 can estimate the noise perception indicator based on the noise spectrum of the environmental noise.

In one embodiment, the processor 104 can estimate the noise perception indicator based on one or a combination of the noise power of the environmental noise, the noise spectrum of the environmental noise, the physiological feature of the user, and the stress indicator of the user, but the disclosure is not limited thereto.

In step S220, the processor 104 adjusts the noise cancellation mode of the wearable audio device 110 according to the noise perception indicator.

In one embodiment, the wearable audio device 110 has a plurality of predetermined noise cancellation modes. For example, the predetermined noise cancellation modes may include a strong noise cancellation mode, a medium noise cancellation mode, a weak noise cancellation mode, and a zero noise cancellation mode.

In one embodiment, when the wearable audio device 110 operates in the zero noise cancellation mode, the wearable audio device 110 may perform no noise cancellation of the environmental noise. In one embodiment, when the wearable audio device 110 operates in the weak noise cancellation mode, the wearable audio device 110 may slightly cancel a part of the environmental noise, such that the user perceives less of the environmental noise in comparison with the situation where the wearable audio device 110 operates in the zero noise cancellation mode.

In one embodiment, when the wearable audio device 110 operates in the medium noise cancellation mode, the wearable audio device 110 may cancel more of the environmental noise, such that the user perceives less of the environmental noise in comparison with the situation where the wearable audio device 110 operates in the weak noise cancellation mode. In one embodiment, when the wearable audio device 110 operates in the strong noise cancellation mode, the wearable audio device 110 may cancel most or almost all of the environmental noise, such that the user perceives less or none of the environmental noise in comparison with the situation where the wearable audio device 110 operates in the medium noise cancellation mode. In other embodiments, the wearable audio device 110 can be designed with more or less of the predetermined noise cancellation modes.

From another perspective, the predetermined noise cancellation modes can be regarded as respectively corresponding to a plurality of noise cancellation intensities. For example, the noise cancellation intensity of the strong noise cancellation mode can be regarded as being higher than the noise cancellation intensity of the medium noise cancellation mode; the noise cancellation intensity of the medium noise cancellation mode can be regarded as being higher than the noise cancellation intensity of the weak noise cancellation mode; the noise cancellation intensity of the weak noise cancellation mode can be regarded as being higher than the noise cancellation intensity of the zero noise cancellation mode, but the disclosure is not limited thereto.

In the embodiments of the disclosure, the noise perception indicator can be assumed to be positively related to the disturbing level of the environmental noise felt by the user. That is, the higher the noise perception indicator, the user feels more disturbed by the environmental noise, and vice versa.

In one embodiment, the noise perception indicator is between an indicator range, and the indicator range is divided into a plurality of sections respectively corresponding to the predetermined noise cancellation modes. For example, assuming that the indicator range is from 0 to 100, the indicator range may be divided into 4 sections respectively corresponding to the strong noise cancellation mode, the medium noise cancellation mode, the weak noise cancellation mode, and the zero noise cancellation mode. In this case, the section corresponding to the strong noise cancellation mode may be from 100 to 76, the section corresponding to the medium noise cancellation mode may be from 75 to 51, the section corresponding to the weak noise cancellation mode may be from 50 to 26, and the section corresponding to the zero noise cancellation mode may be from 25 to 0, but the disclosure is not limited thereto.

In one embodiment, the processor 104 can obtain a first section where the noise perception indicator belongs among the sections. For example, based on the above assumption, if the noise perception indicator is 80, the processor 104 will determine to apply the strong noise cancellation mode to the first section; if the noise perception indicator is 60, the processor 104 will determine to apply the medium noise cancellation mode to the first section.

Next, the processor 104 obtains a first predetermined noise cancellation mode corresponding to the first section among the predetermined noise cancellation modes. For example, if the section corresponding to the strong noise cancellation mode is determined to be the first section, the processor 104 may determine the strong noise cancellation mode as the first predetermined noise cancellation mode; if the section corresponding to the weak noise cancellation mode is determined to be the first section, the processor 104 may determine the weak noise cancellation mode as the first predetermined noise cancellation mode.

Afterward, the processor 104 adjusts the noise cancellation mode of the wearable audio device to be the first predetermined noise cancellation mode. For example, if the first predetermined noise cancellation mode is determined to be the strong noise cancellation mode, the processor 104 can adjust the noise cancellation mode of the wearable audio device to be the strong noise cancellation mode; if the first predetermined noise cancellation mode is determined to be the zero noise cancellation mode, the processor 104 can adjust the noise cancellation mode of the wearable audio device to be the zero noise cancellation mode.

In one embodiment, the corresponding noise cancellation intensity of the first predetermined noise cancellation mode is positively related to the noise perception indicator. That is, the higher the noise perception indicator, the noise cancellation mode with higher noise cancellation intensity would be determined to be the first predetermined noise cancellation mode.

In other embodiments, the noise perception indicator can be assumed to be negatively related to the disturbing level of the environmental noise felt by the user. That is, the lower the noise perception indicator, the user feels more disturbed by the environmental noise, and vice versa. In this case, the correspondence between the sections in the indicator range and the predetermined noise cancellation modes can be accordingly adjusted. For example, the section corresponding to the strong noise cancellation mode may be from 0 to 25, the section corresponding to the medium noise cancellation mode may be from 26 to 50, the section corresponding to the weak noise cancellation mode may be from 51 to 75, and the section corresponding to the zero noise cancellation mode may be from 76 to 100, but the disclosure is not limited thereto.

In this case, the corresponding noise cancellation intensity of the first predetermined noise cancellation mode is negatively related to the noise perception indicator. That is, the lower the noise perception indicator, the noise cancellation mode with higher noise cancellation intensity would be determined to be the first predetermined noise cancellation mode.

In one embodiment, after adjusting the noise cancellation mode of the wearable audio device 110 to be the first predetermined noise cancellation mode, the processor 104 further performs the corresponding noise cancellation operation. In particular, the processor 104 can combine the environmental noise with a compensation signal has a destructive interference to the environmental noise, such that the user can hear less of the environmental noise. In one embodiment, the signal intensity of the compensation signal is positively related to the corresponding noise cancellation intensity of the first predetermined noise cancellation mode. That is, the higher the noise cancellation intensity of the first predetermined noise cancellation mode, the signal intensity of the compensation signal would be higher, such that more of the environmental noise would be cancelled.

In other embodiments, the processor 104 can perform other mechanisms to better manage the wearable audio device 110, which would be discussed in the following.

Figure 3:
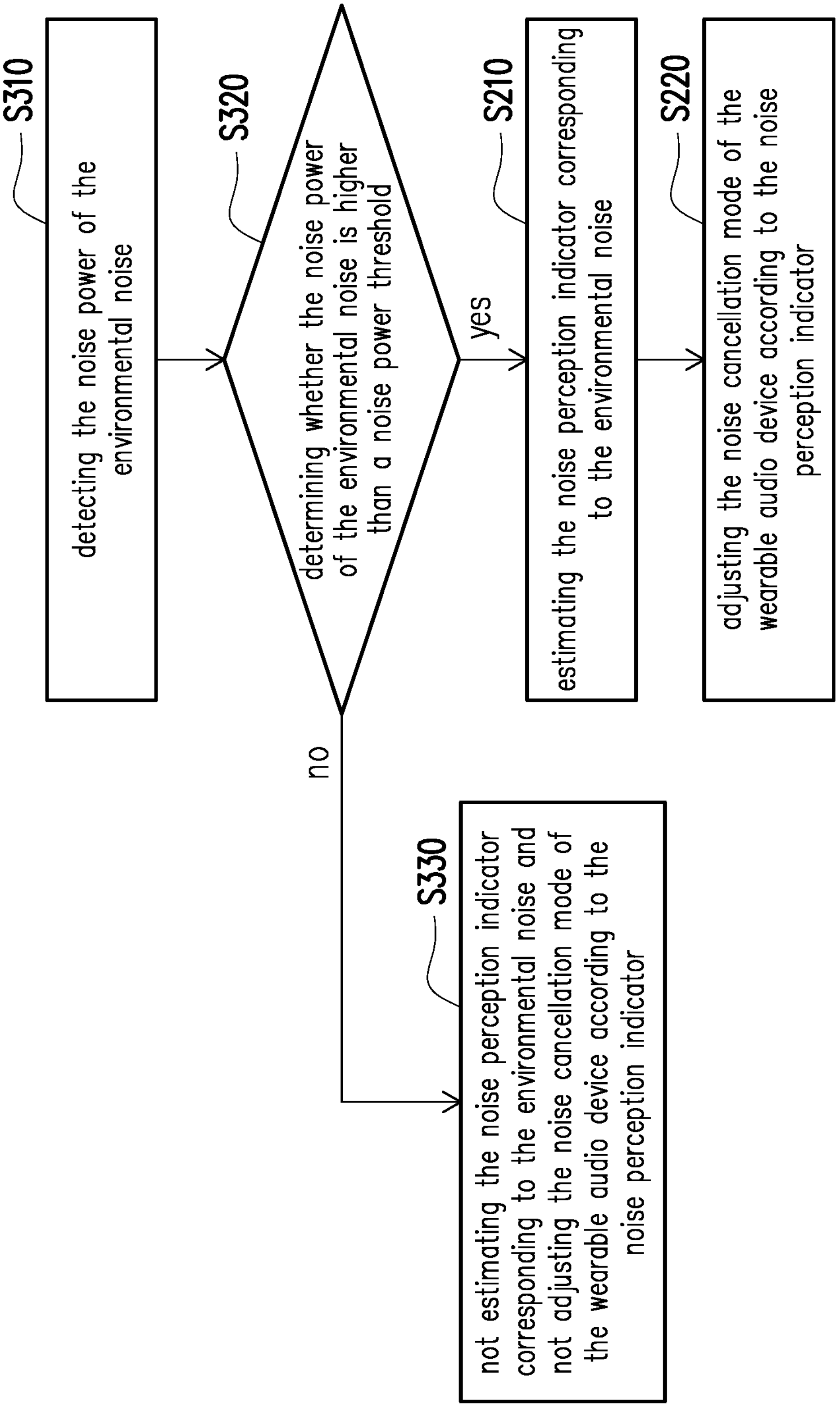
FIG. 3 shows a flow chart of determining whether to adjust the noise cancellation mode according to an embodiment of the disclosure.

See FIG. 3, which shows a flow chart of determining whether to adjust the noise cancellation mode according to an embodiment of the disclosure. The method of this embodiment may be executed by the electronic device 100 in FIG. 1A and FIG. 1B, and the details of each step in FIG. 3 will be described below with the components shown in FIG. 1A and FIG. 1B.

In step S310, the processor 104 detects the noise power of the environmental noise. In step S320, the processor 104 determines whether the noise power of the environmental noise is higher than a noise power threshold. In different embodiments, the noise power threshold can be determined to be any value based on the requirements of the designer. For example, since a noise whose noise power is higher than 70 dB would be more possible to make people feel disturbed, the noise power threshold may be determined to be 70 dB, but the disclosure is not limited thereto.

In one embodiment, if the processor 104 determines the noise power of the environmental noise is higher than the noise power threshold in step S320, it represents that the environmental noise is highly possible to make the user feel disturbed. Therefore, the processor 104 can subsequently perform steps S210 and S220, such that the wearable audio device 110 worn by the user can be controlled to adaptively provide the noise cancellation function. Details of the steps S210 and S220 can be referred to the above teachings, which would not be repeated herein.

In one embodiment, if the processor 104 determines the noise power of the environmental noise is not higher than the noise power threshold in step S320, it represents that the environmental noise is less possible to make the user feel disturbed. Therefore, the processor 104 can subsequently perform step S330 to not estimate the noise perception indicator corresponding to the environmental noise and not adjust the noise cancellation mode of the wearable audio device according to the noise perception indicator.

Figure 4:
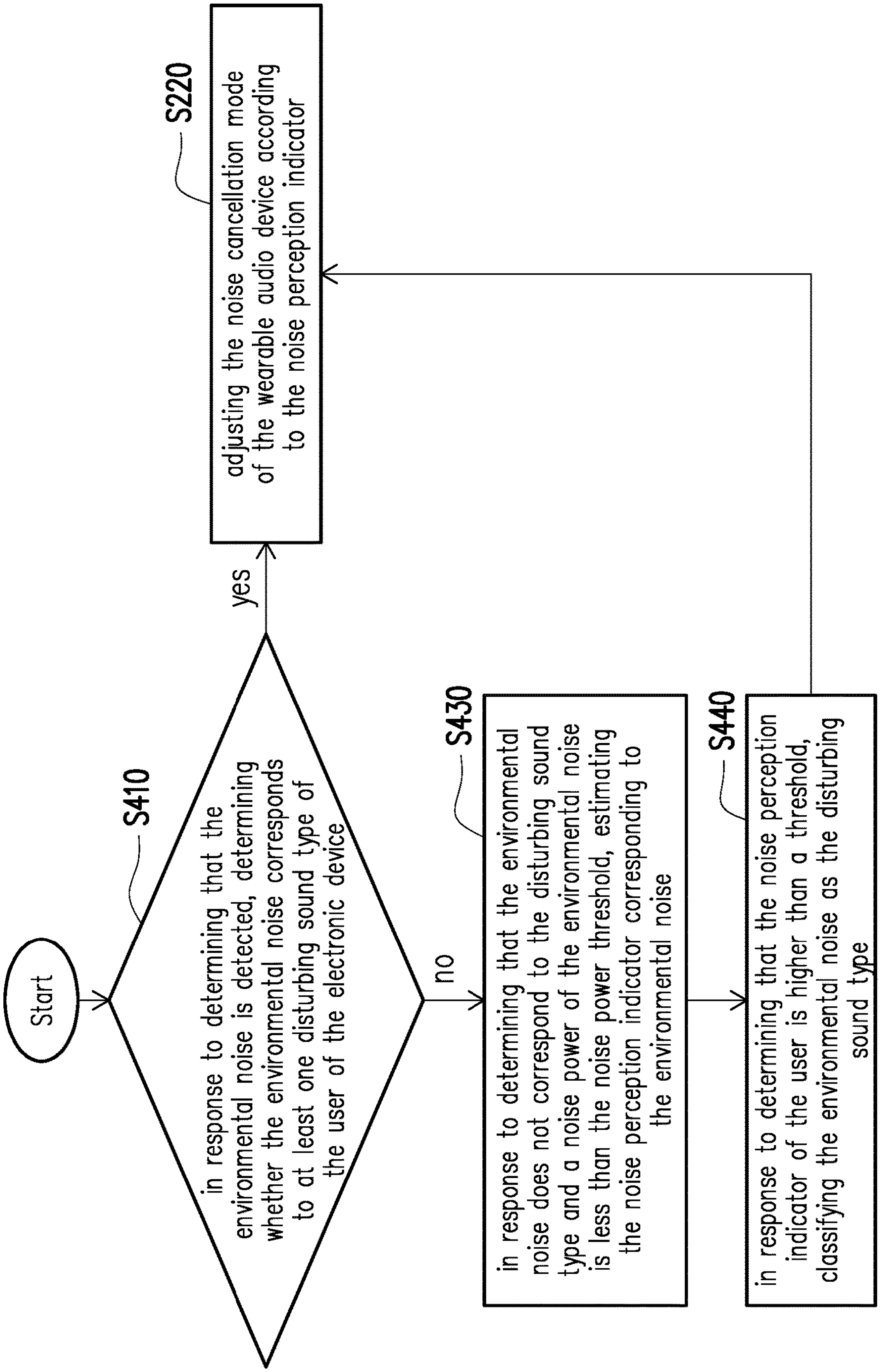
FIG. 4 shows a flow chart of the mechanism for dealing with disturbing sound type according to an embodiment of the disclosure.

See FIG. 4, which shows a flow chart of the mechanism for dealing with disturbing sound type according to an embodiment of the disclosure. The method of this embodiment may be executed by the electronic device 100 in FIG. 1A and FIG. 1B, and the details of each step in FIG. 4 will be described below with the components shown in FIG. 1A and FIG. 1B.

In step S410, in response to determining that the environmental noise is detected, the processor 104 determines whether the environmental noise corresponds to at least one disturbing sound type of the user of the electronic device 100.

In detail, since different people have different feelings of sounds, a person may feel disturbed by some particular types of noises, even if the noise power thereof is low (e.g., less than the noise power threshold). For example, a person may feel disturbed by the squeaky sounds generated when a blackboard is scratched, even if the dB of this sound is low. In one embodiment, those particular types of noises can be referred to as the disturbing sound type(s), and the electronic device 100 can determine the disturbing sound type(s) for the user of the electronic device 100 and/or the wearable audio device 110.

In FIG. 4, assuming that no disturbing sound type corresponding to the user has been determined. In this case, the processor 104 can proceed to step S430.

In step S430, in response to determining that the environmental noise does not correspond to the disturbing sound type and the noise power of the environmental noise is less than the noise power threshold, the processor 104 can estimate the noise perception indicator corresponding to the environmental noise. The detail of estimating the noise perception indicator corresponding to the environmental noise can be referred to the above teachings, which would not be repeated herein.

In this case, the processor 104 can determine how the user is disturbed by the environmental noise based on the noise perception indicator when the noise power of the environmental noise is low.

In one embodiment, the processor 104 can determine whether the noise perception indicator of the user is higher than a threshold. If yes, it represents that even if the noise power of the environmental noise is low, the environmental noise still makes the user feel quite disturbed, which means that the environmental noise belongs to the disturbing sound type corresponding to the user. Accordingly, in step S440, in response to determining that the noise perception indicator of the user is higher than the threshold, the processor 104 classifies the environmental noise as the disturbing sound type and proceed to step S420 to adjust the noise cancellation mode of the wearable audio device 110 according to the noise perception indicator.

In one embodiment, the predetermined noise cancellation modes can include a specific noise cancellation mode corresponding to the disturbing sound type. In this case, when the environmental noise is determined to belong to the disturbing sound type, the processor 104 can directly adjust the noise cancellation mode of the wearable audio device 110 to be the specific noise cancellation mode. In one embodiment, the specific noise cancellation mode corresponding to the disturbing sound type can be one of the predetermined noise cancellation mode, such as the strong noise cancellation mode or the medium noise cancellation mode, or a noise cancellation mode to cancel a specific frequency band corresponding to a specific disturbing sound type, but the disclosure is not limited thereto.

In one embodiment, in the process of classifying the environmental noise as the disturbing sound type, the processor 104 can retrieve a plurality of audio features of the environmental noise and establish a new disturbing sound type based on the audio features of the environmental noise. Next, the processor 104 can add the new disturbing sound type into the established disturbing sound types.

In other embodiments, if the noise perception indicator of the user is not higher than the threshold, it represents that the environmental noise does not make the user feel disturbed, which means that the environmental noise does not belong to the disturbing sound type corresponding to the user. In this case, the processor 104 will not adjust the noise cancellation mode of the wearable audio device 110.

In the embodiments where the disturbing sound type has been determined/established, the processor 104 can directly proceed to step S220 when determining that the environmental noise corresponds to the disturbing sound type in step S410.

Figure 5:
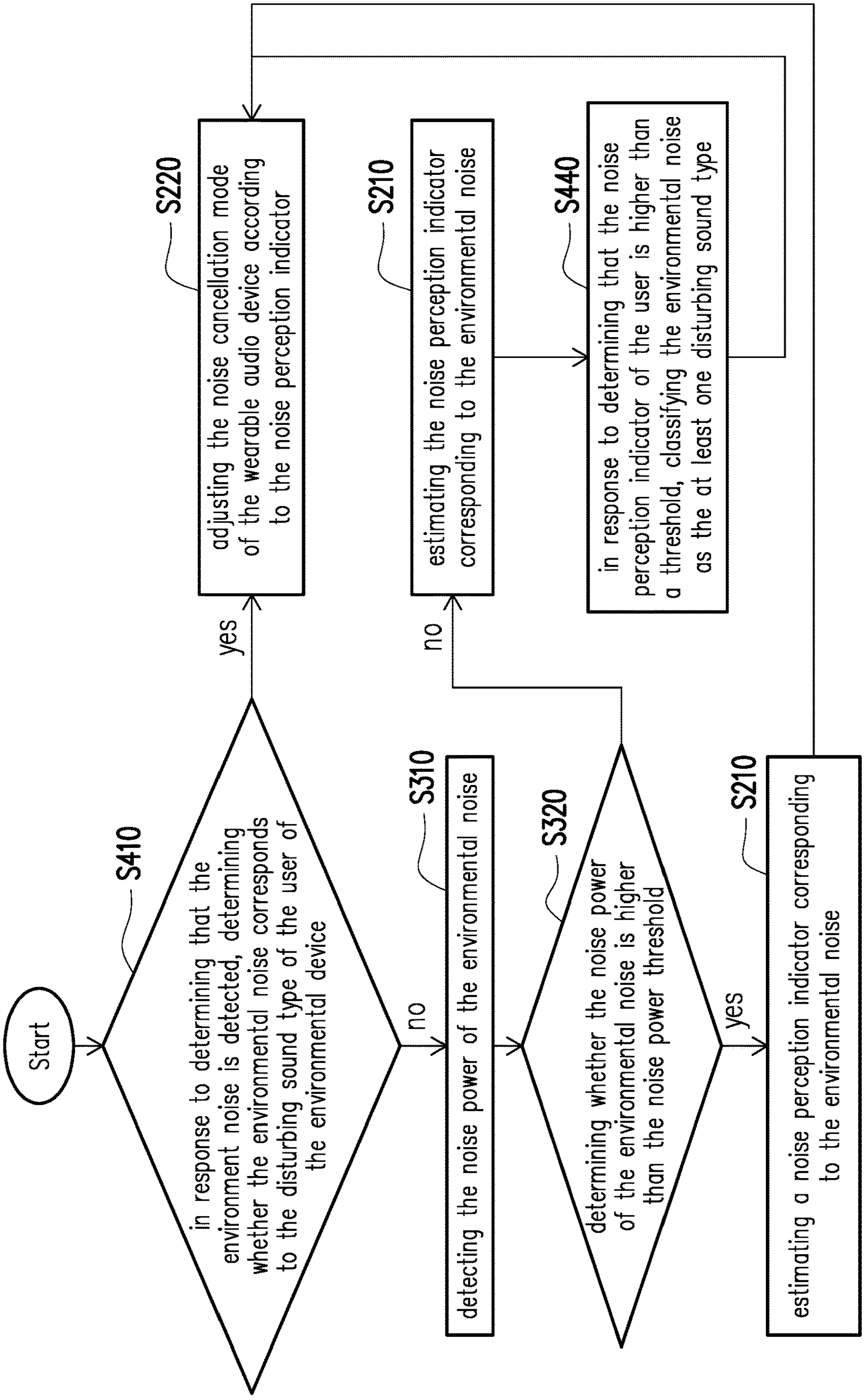
FIG. 5 shows a flow chart that combines the concepts of FIG. 3 and FIG. 4 according to an embodiment of the disclosure.

See FIG. 5, which shows a flow chart that combines the concepts of FIG. 3 and FIG. 4 according to an embodiment of the disclosure. The method of this embodiment may be executed by the electronic device 100 in FIG. 1A and FIG. 1B, and the details of each step in FIG. 5 will be described below with the components shown in FIG. 1A and FIG. 1B.

In step S410, in response to determining that the environmental noise is detected, the processor 104 determines whether the environmental noise corresponds to the disturbing sound type of a user of the electronic device 100. If yes, the processor 104 can proceed to step S220 to adjust the noise cancellation mode of the wearable audio device according to the noise perception indicator. If not, the processor 104 can proceed to step S310 to detect the noise power of the environmental noise and perform step S320 to determine whether the noise power of the environmental noise is higher than the noise power threshold.

In response to determining that the noise power of the environmental noise is higher than the noise power threshold, the processor 104 can perform steps S210 and S220. On the other hand, in response to determining that the noise power of the environmental noise is not higher than the noise power threshold, the processor 104 can perform steps S210, S440, and S220. Details of the steps in FIG. 5 can be referred to the above embodiments, which would not be repeated herein.

As can be understood based on the above, the noise cancellation mode of the wearable audio device 110 can be adjusted based on the noise perception indicator that characterizes how the user feels about the environmental noise. In addition, the noise cancellation mode can be further adjusted based on the determination of whether the environmental noise corresponds to the disturbing sound type. Accordingly, the noise cancellation mode for the user can be determined in a more intelligent approach, thereby the user experience can be improved.

In the embodiments where the electronic device 100 is the wearable audio device 110, the environmental noise can be received by the audio receiving element of the wearable audio device 110.

In the embodiments where the electronic device 100 and the wearable audio device 110 are different devices and coupled to a smart device, the processor 104 may send a control signal to the smart device, wherein the control signal controls the smart device to adjust the noise cancellation mode of the wearable audio device 110.

Figure 6:
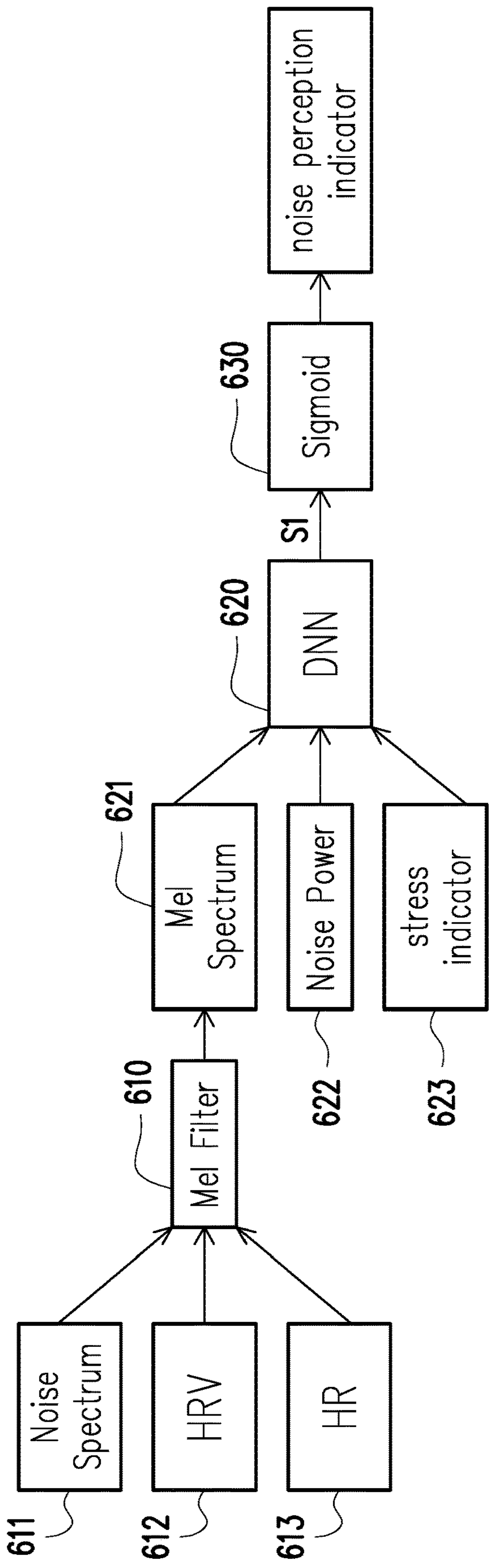
FIG. 6 shows a schematic diagram of determining the noise perception indicator according to an embodiment of the disclosure.

See FIG. 6, which shows a schematic diagram of determining the noise perception indicator according to an embodiment of the disclosure.

In FIG. 6, at least on of the noise spectrum 611 of the environmental noise, the HR 612 of the user, and the HRV 613 of the user can be inputted to the Mel filter 610 for extracting the corresponding Mel-Frequency Cepstral Coefficients (MFCC) thereof as the Mel spectrum 620.

In one embodiment, the Mel spectrum 620 are combined with the noise power 622 of the environmental noise and the stress indicator 623 corresponding to the user into an input signal of a deep neural network (DNN) 620.

In one embodiment, the DNN 620 can generate an output signal S1 in response to the input signal, wherein the output signal S1 can be regarded as characterizing how the user feels about the environmental noise. In various embodiments, the output signal S1 can be positively related to at least one of the HRV 612, the HR 613, the noise power 622, and the stress indicator 623, but the disclosure is not limited thereto.

In one embodiment, the output signal S1 can be converted into the noise perception indicator by a sigmoid function 630. In this case, the indicator range of the noise perception indicator would be from 0 to 1, but the disclosure is not limited thereto. In various embodiments, the noise perception indicator can be also positively related to at least one of the HRV 612, the HR 613, the noise power 622, and the stress indicator 623, but the disclosure is not limited thereto.

In one embodiment, for enabling the DNN 620 the above capability, the DNN 620 can be properly trained through a training process. In the training process, the DNN 620 can be trained by using a plurality of training data. In one embodiment, each training data can be generated based on a similar way of combining the noise power 622 of the environmental noise and the stress indicator 623 corresponding to the user into the input signal. For example, a noise determined to be disturbing can be processed to obtain the corresponding noise power, the corresponding Mel spectrum, and the corresponding stress indicator, and these parameters corresponding to this noise can be combined into one training signal for training the DNN 620. In this case, the DNN 620 can learn the features of the noise that disturbs people. Therefore, when the trained DNN 620 receives an input signal having the components of the noise power, the Mel spectrum, and the stress indicator corresponding to some noise, the DNN 620 can accordingly output an output signal that characterizing how the corresponding user feels about the noise corresponding to the input signal, but the disclosure is not limited thereto.

In one embodiment, the processor 104 can use a linear or a non-linear combination of at least one of the noise spectrum 611, the HRV 612, the HR 613, the noise power 622, and the stress indicator 623 to characterize the noise perception indicator, and the coefficients of these parameters for obtaining the linear or the non-linear combination can be determined based on the requirements of the designer, but the disclosure is not limited thereto.

In one embodiment, the processor 104 can show the noise perception indicator on, for example, a display of the electronic device 100 or on a display of the smart device connected to the electronic device 100 for the user's reference. In this case, the user can understand how the environmental noise affects the user's mental/physical health. Therefore, the user can decide whether to move to a quieter place or block/decrease the environmental noise.

In one embodiment, the processor 104 can determine whether the noise perception indicator satisfies a predetermined condition. For example, the processor 104 can determine whether the noise perception indicator has been higher than a specific threshold over a predetermined time length. If yes, the processor 104 may determine that the noise perception indicator satisfies the predetermined condition and may have affected the mental/physical health of the user, and hence the processor 104 can show a notification or a warning on the electronic device 110 and/or the smart device for notifying the user. Accordingly, the user can decide whether to move to a quieter place or block/decrease the environmental noise.

For example, the processor 104 can determine whether the noise perception indicator has been higher than the specific threshold. If yes, the processor 104 may determine that the noise perception indicator satisfies the predetermined condition and accordingly show the notification or the warning to notify the user, but the disclosure is not limited thereto.

The disclosure further provides a computer readable storage medium for executing the method for adjusting a noise cancellation mode. The computer readable storage medium is composed of a plurality of program instructions (for example, a setting program instruction and a deployment program instruction) embodied therein. These program instructions can be loaded into the hosts 100, 800 and executed by the same to execute the method for adjusting the noise cancellation mode and the functions of the electronic device 100 described above.

In summary, the embodiments of the disclosure can adjust the noise cancellation mode of the wearable audio device based on the noise perception indicator that characterizes how the user feels about the environmental noise. In addition, the embodiments of the disclosure can further adjust the noise cancellation mode based on the determination of whether the environmental noise corresponds to the disturbing sound type. Accordingly, the embodiments of the disclosure can determine the noise cancellation mode for the user in a more intelligent approach, thereby the user experience can be improved. In this case, the mental/physical health of the user can be prevented from being negatively affected by the environmental noise.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for adjusting a noise cancellation mode, adapted to an electronic device, comprising:

detecting an environmental noise, and determining whether the environmental noise corresponds to at least one disturbing sound type of a user of the electronic device;

in response to determining that the environmental noise corresponds to the at least one disturbing sound type, adjusting the noise cancellation mode of the wearable audio device to be a specific noise cancellation mode corresponding to the disturbing sound type;

in response to determining that the environmental noise does not correspond to the at least one disturbing sound type and a noise power of the environmental noise is less than a noise power threshold, estimating a noise perception indicator corresponding to the environmental noise based on at least one physiological feature of the user of the electronic device; and in response to determining that the noise perception indicator of the user is higher than a threshold, classifying the environmental noise with the estimated noise perception indicator being higher than the threshold as the at least one disturbing sound type.

2. The method according to claim 1, wherein the step of classifying the environmental noise with the estimated noise perception indicator being higher than the threshold as the at least one disturbing sound type comprises:

retrieving a plurality of audio features of the environmental noise;

establishing a previously presented disturbing sound type based on the audio features of the environmental noise, and classifying the previously presented disturbing sound type as the at least one disturbing sound type.

3. The method according to claim 1, wherein the step of estimating the noise perception indicator corresponding to the environmental noise further comprises:

estimating the noise perception indicator corresponding to the environmental noise based on at least one of a noise spectrum of the environmental noise, and a stress indicator of the user.

4. The method according to claim 1, wherein the wearable audio device has a plurality of predetermined noise cancellation modes, the noise perception indicator is between an indicator range, the indicator range is divided into a plurality of sections respectively corresponding to the predetermined noise cancellation modes, and the step of adjusting the noise cancellation mode of the wearable audio device according to the noise perception indicator comprises:

obtaining a first section where the noise perception indicator belongs among the sections;

obtaining a first predetermined noise cancellation mode corresponding to the first section among the predetermined noise cancellation modes; and adjusting the noise cancellation mode of the wearable audio device to be the first predetermined noise cancellation mode.

5. The method according to claim 4, wherein the predetermined noise cancellation modes respectively correspond to a plurality of noise cancellation intensities, and the corresponding noise cancellation intensity of the first predetermined noise cancellation mode is positively related to the noise perception indicator.

6. The method according to claim 5, wherein after the step of adjusting the noise cancellation mode of the wearable audio device to be the first predetermined noise cancellation mode, the method further comprises:

combining the environmental noise with a compensation signal, wherein the compensation signal has a destructive interference to the environmental noise, and a signal intensity of the compensation signal is positively related to the corresponding noise cancellation intensity of the first predetermined noise cancellation mode.

7. The method according to claim 1, wherein both of the electronic device and the wearable audio device are connected to a smart device, and the method comprises:

sending a control signal to the smart device, wherein the control signal controls the smart device to adjust the noise cancellation mode of the wearable audio device.

8. The method according to claim 1, further comprising: showing the noise perception indicator.

9. The method according to claim 1, further comprising:

in response to determining that the noise perception indicator satisfies a predetermined condition, showing a notification or a warning.

10. An electronic device, comprising:

a non-transitory storage circuit, storing a program code; and a processor, coupled to the non-transitory storage circuit and accessing the program code to perform:

detecting an environmental noise, and determining whether the environmental noise corresponds to at least one disturbing sound type of a user of the electronic device;

in response to determining that the environmental noise corresponds to the at least one disturbing sound type, adjusting the noise cancellation mode of the wearable audio device to be a specific noise cancellation mode corresponding to the disturbing sound type;

in response to determining that the environmental noise does not correspond to the at least one disturbing sound type and a noise power of the environmental noise is less than a noise power threshold, estimating a noise perception indicator corresponding to the environmental noise based on at least one physiological feature of the user of the electronic device; and in response to determining that the noise perception indicator of the user is higher than a threshold, classifying the environmental noise with the estimated noise perception indicator being higher than the threshold as the at least one disturbing sound type.

11. The electronic device according to claim 10, wherein the wearable audio device is a wireless earphone.

12. A non-transitory computer readable storage medium, the computer readable storage medium recording an executable computer program, the executable computer program being loaded by an electronic device to perform the method according to claim 1.

13. A wearable audio device, comprising:

an audio receiving element, receiving an environmental noise;

a non-transitory storage circuit, storing a program code; and a processor, coupled to the non-transitory storage circuit and accessing the program code to perform:

detecting the environmental noise, and determining whether the environmental noise corresponds to at least one disturbing sound type of a user of the wearable audio device;

in response to determining that the environmental noise corresponds to the at least one disturbing sound type, adjusting the noise cancellation mode of the wearable audio device to be a specific noise cancellation mode corresponding to the disturbing sound type;

in response to determining that the environmental noise does not correspond to the at least one disturbing sound type and a noise power of the environmental noise is less than a noise power threshold, estimating a noise perception indicator corresponding to the environmental noise based on at least one physiological feature of the user of the electronic device; and in response to determining that the noise perception indicator of the user is higher than a threshold, classifying the environmental noise with the estimated noise perception indicator being higher than the threshold as the at least one disturbing sound type.

* * * * *